United States Patent Office 3,072,604
Patented Jan. 8, 1963

3,072,604
POLY-α-OLEFIN COMPOSITIONS CONTAINING DIALKYL-3,3'-THIODIPROPIONATES AND A NITROGEN CONTAINING COMPOUND
Clarence E. Tholstrup, Kingsport, Tenn., assignor to Eastman Kodak Company, Rochester, N.Y., a corporation of New Jersey
No Drawing. Filed Mar. 23, 1960, Ser. No. 16,969
14 Claims. (Cl. 260—45.85)

This invention relates to new poly-α-olefin compositions. Preferred embodiments of the invention relate to polyethylene and polypropylene compositions having improved stability at elevated temperatures to oxidative degradation.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degration of the polymer. In addition, many uses of poly-α-olefins, such as in electrical insulation and the like, often times expose the poly-α-olefin to elevated temperatures. To minimize oxidative deterioration in poly-α-olefins, antioxidants or stabilizers are often times incorporated therein.

It is an object of this invention to provide new poly-α-olefin compositions having improved resistance to thermal degradation.

It is another object of this invention to provide new synergistic combinations of stabilizers for poly-α-olefin compositions.

It is also an object of this invention to provide novel polyethylene and polypropylene compositions containing synergistic combinations of compounds that improve the stability of the polyethylene and polypropylene compositions against deterioration resulting from exposure to elevated temperatures.

Other objects of the invention will be apparent from the description and claims that follow.

The present invention comprises poly-α-olefin composition having incorporated therein a stabilizer combination of a diester of 3,3'-thiodipropionic acid and a hydroxyl-containing amine.

The diesters of 3,3'-thiodipropionic acid comprising the present stabilizer combinations have the following formula

wherein R is an alkyl radical generally having 4 to 20 carbon atoms, with 8 to 18 carbon atoms being preferred. A particularly effective ester has twelve carbon atoms for the R substituent, namely, dilauryl-3,3'-thiodipropionate. However, any diester of 3,3'-thiodipropionic acid as described above can be employed in the present stabilizer combination including the butyl, amyl, hexyl, heptyl, octyl, nonyl, decyl, tridecyl, myristyl, pentadecyl, cetyl, heptadecyl, stearyl and eicosyl diesters of 3,3'-thiodipropionic acid, or mixtures thereof.

A wide variety of hydroxyl-containing amines can be effectively utilized in combination with the described diesters of 3,3'-thiodipropionic acid, as illustrated by those hydroxyl-containing amines or nitrogen-containing compounds having the formulas:

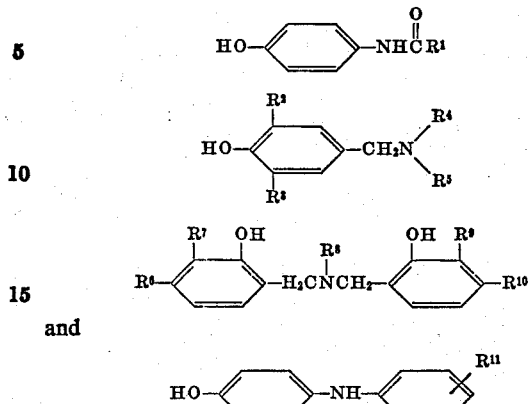

and wherein $R^1$, $R^2$, $R^3$, $R^4$, $R^5$, $R^6$, $R^7$, $R^8$, $R^9$, and $R^{10}$ are alkyl radicals having 1 to 18 carbon atoms, and preferably 1 to 12 carbon atoms; and wherein $R^{11}$ is an alkyl radical or an alkoxy radical, both having 1 to 18 carbon atoms, and preferably 1 to 12 carbon atoms.

Typical hydroxyl-containing amines that can be suitably employed in combination with dialkyl-3,3'-thiodipropionates include:

4-hydroxy-4'-methoxydiphenylamine,
4-hydroxy-4'-isobutoxydiphenylamine,
4-hydroxy-4'-n-octyldiphenylamine,
3-tert.-butyl-4'-hydroxydiphenylamine,
4-hydroxy-4'-lauryldiphenylamine,
2-tert.-butyl-4'-hydroxydiphenylamine,
4-hydroxy-4'-stearyldiphenylamine,
3-stearyl-4'-hydroxydiphenylamine,
2,6-di-tert.-butyl-p-dimethylaminomethylphenol,
2,6-dimethyl-p-distearylaminomethylphenol,
2,6-di-tert.-octyl-p-dilaurylaminomethylphenol,
2,6-distearyl-p-dimethylaminomethylphenol,
2,6-dilauryl-p-diethylaminomethylphenol,
N,N-bis(2-hydroxy-3-tert.-butyl-5-methylbenzyl) methylamine,
N,N-bis(2-hydroxy-3-tert.-butyl-5-laurylbenzyl) laurylamine,
N,N-bis(2-hydroxy-3-lauryl-5-stearylbenzyl)-n-butylamine,
N,N-bis(2-hydroxy-3-stearyl-5-methylbenzyl) methylamine,
N,N-bis(2-hydroxy-3-methyl-5-tert.-butylbenzyl) stearylamine,
N-acetyl-p-aminophenol,
N-n-butyryl-p-aminophenol,
N-caprylyl-p-aminophenol,
N-pelargonyl-p-aminophenol,
N-myristoyl-p-aminophenol,
N-lauroyl-p-aminophenol,
N-palmitoyl-p-aminophenol,
N-n-nonadecanoyl-p-aminophenol,
and related hydroxyl-containing amines.

The combination of the described diesters of 3,3'-thiodipropionic acid and hydroxyl-containing amines can be used to stabilize a wide variety of solid poly-α-olefin compositions against deterioration resulting from exposure to elevated temperatures. Any of the normally solid polymers of α-monoolefinic aliphatic hydrocarbons containing 2 to 10 carbon atoms can be stabilized in accordance with the invention. The subject stabilizer combinations are preferably used in polyethylene and polypropylene, particularly polypropylene, although such poly-α-olefins as poly(3-methylbutene-1), poly(4-methylpentene-1), poly(pentene-1), poly(3,3-dimethylbutene-1), poly(4,4-dimethylbutene-1), poly(octene-1), poly(decene-1) and the like can also be stabilized with the subject stabilizer combinations. Both the so-called "low density" and "high density" or high crystallinity poly-α-olefin compositions can be stabilized in accordance with the invention. Reference is made to Fawcett et al. U.S. Patent No. 2,153,553 granted April 11, 1939, and to copending applications Coover U.S. Serial No. 559,536, filed January 17, 1956, now abandoned, and Coover et al. U.S. Serial No. 724,904, filed March 31, 1958, now abandoned, with regard to the preparation of various poly-α-olefin compositions that can be stabilized against thermal degradation in accordance with the invention. The additive stabilizer combinations of the invention are especially useful for stabilizing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 3,000 to 12,000.

The amount of the combination of the diester of 3,3'-thiodipropionic acid and the hydroxyl-containing amine employed in poly-α-olefin compositions in accordance with the invention can be widely varied, the stabilizing amount of this combination usually varying with the particular use to which the poly-α-olefin compositions are to be put. Concentrations of at least about .001% of each stabilizer component are suitable, although about .001% to 5% for each stabilizer component are generally used, with about 0.1% to 3% of the diester of 3,3'-thiodipropionic acid and about .01% to 1% of the hydroxyl-containing amine being preferred, the concentration being based on the weight of the poly-α-olefin. We generally utilize the combination of the subject stabilizers at a weight ratio of the diester of 3,3'-thiodipropionic acid to the hydroxyl-containing amine in the range of 1/100 to 100/1, and preferably 1/50 to 50/1.

The stabilizer combinations of the invention can be incorporated or blended into poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled, or molded into sheets, rods, tubes, pipes, filaments and other shaped articles, including the widely used films of the polymers about .5 to 100 mils in thickness. The present compositions can be used for coating paper, wire, metal foil, glass fiber fabrics, synthetic and natural textiles or fabrics, and other such materials.

The subject stabilizer combinations of dialkyl esters of 3,3'-thiodipropionic acid and hydroxyl-containing amine are synergistic combinations, namely, the stabilizing effect of such combinations in poly-α-olefins is substantially greater than the additive effect of the individual components of the combination.

The invention is illustrated by the following examples of preferred embodiments thereof. In the following examples the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002 N sodium thiosulfate. The peroxide concentration, P, in milliequivalents per kilogram of polymer is given by the expression, $P=8S$, where S is the number of milliliters of 0.002 N sodium thiosulfate used.

EXAMPLE 1

Several samples of powdered polypropylene were mixed with dilauryl-3,3'-thiodipropionate and typical hydroxyl-containing amines of the invention, compression molded into plates 1/16 inch in thickness, and the resulting molded samples evaluated with respect to stability by the 160° C. oven storage test described above. The polypropylene was a plastic grade solid polypropylene having an average molecular weight greater than 15,000, a density of about .91 and an inherent viscosity of about 1.48 as determined in tetralin at 145° C. The results of the stability tests are summarized by the data set out in Table A below. Samples of the individual components of the various stabilizer combinations in the polypropylene, as well as the polypropylene with no additive, were included in the stability test for purposes of comparison. In Table A, dilauryl-3,3'-thiodipropionate is indicated as "DLTDP." The concentrations in Table A are based on the weight of the polypropylene.

*Table A*

| Additive: | Oven life at 160° C. hours |
|---|---|
| None | 0.2 |
| 0.1% DLTDP | 1 |
| 0.05% 2,6-di-tert.-butyl-p-(dimethylaminomethyl)phenol | 4 |
| 0.05% 2,6-di-tert.-butyl-p-(dimethylaminomethyl)phenol+0.1% DLTDP | 20 |
| 0.05% 3-tert.-butyl-4'-hydroxydiphenylamine | 6 |
| 0.05% 3-tert.-butyl-4'-hydroxydiphenylamine +0.1% DLTDP | 30 |
| 0.05% N,N-bis-(2-hydroxy-3-tert.-butyl-5-methylbenzyl)methylamine | 4 |
| 0.05% N,N-bis-(2-hydroxy-3-tert.-butyl-5-methylbenzyl)methylamine+0.1% DLTDP | 25 |

As can be observed from the data set out in Table A above, combinations of certain hydroxyl-containing amines and dilauryl-3,3'-thiodipropionate are synergistic combinations with respect to the stabilization of polypropylene, the stabilizing effect of such combinations being substantially more than the additive stabilizing effect of the components thereof. Similar synergism is demonstrated if solid plastic grade polyethylene having an average molecular weight greater than 15,000, a melt index of about 7.59 and a density of about .91 is substituted for the polypropylene, or if distearyl-3,3'-thiodipropionate or di-n-octyl-3,3'-thiodipropionate is substituted for the dilauryl-3,3'-thiodipropionate.

EXAMPLE 2

Other stabilizer combinations of the invention were evaluated by the method described in Example 1 in the stabilization of solid plastic grade polypropylene having an average molecular weight greater than 15,000, a density of about .91 and an inherent viscosity of about 1.25 as determined in tetralin at 145° C. The results of the test are summarized by the data set out in Table B below. In Table B, dilauryl-3,3'-thiodipropionate is indicated as "DLTDP." The concentrations in Table B are based on the weight of the polypropylene.

Table B

| Additive: | Oven life at 160° C. hours |
|---|---|
| None | 2 |
| 0.3% DLTDP | 3 |
| 0.05% 4-hydroxy-4'-methoxydiphenylamine | 12 |
| 0.05% 4-hydroxy-4'-methoxydiphenylamine+0.3% DLTDP | 60 |
| 0.1%-N-lauroyl-p-aminophenol | 4 |
| 0.1%-N-lauroyl-p-aminophenol+0.3% DLTDP | 15 |

As observed from the data in Table B, dilauryl-3,3'-thiodipropionate synergizes with hydroxyl-containing amines in polypropylene. Similar synergism is demonstrated if di-n-octyl-3,3'-thiodipropionate or distearyl-3,3'-thiodipropionate is substituted for the dilauryl-3,3'-thiodipropionate. Such stabilizer combinations are likewise synergistic stabilizer combinations in polyethylene as demonstrated if solid plastic grade polyethylene having an average molecular weight greater than 15,000, a density of about .91 and a melt index of about 7.59 is substituted for the polypropylene.

As used herein, inherent viscosity ($\eta_i$) is calculated from the formula $$\eta_i = \frac{\ln \eta_r}{C}$$

wherein C is the concentration of the polymer in grams per 100 cc. of tetralin and $\eta_r$ is the ratio of the viscosity of the solution of the polymer and tetralin to that of tetralin. The viscosities are determined at 145° C.

The present invention thus provides novel poly-α-olefin compositions having improved stability against deterioration resulting from exposure to elevated temperatures, and particularly, it provides novel synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

I claim:

1. A solid poly-α-olefin composition comprising a solid poly-α-olefin prepared from an α-monoolefinic aliphatic hydrocarbon having 2 to 10 carbon atoms containing a stabilizer combination comprising at least about .001% by weight based on said poly-α-olefin of a diester of 3,3'-thiodipropionic acid having the formula $$S(CH_2CH_2COR)_2$$

wherein R is an alkyl radical having 4 to 20 carbon atoms, and at least about .001% by weight based on said poly-α-olefin of a nitrogen-containing compound selected from the group consisting of compounds having the formulas

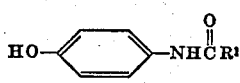

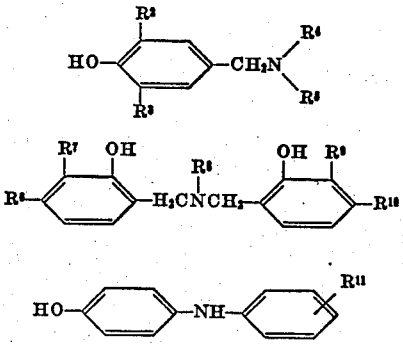

and

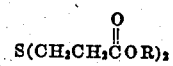

wherein $R^1$, $R^2$, $R^3$, $R^4$, $R^5$, $R^6$, $R^7$, $R^8$, $R^9$, and $R^{10}$ are alkyl radicals having 1 to 18 carbon atoms, and wherein $R^{11}$ is selected from the group consisting of alkyl radicals having 1 to 18 carbon atoms and alkoxy radicals having 1 to 18 carbon radicals.

2. A solid poly-α-olefin composition comprising a solid poly-α-olefin selected from the group consisting of polyethylene and polypropylene containing a stabilizer combination comprising about .001% to 5% by weight based on said poly-α-olefin of a diester of 3,3'-thiodipropionic acid having the formula $$S(CH_2CH_2COR)_2$$

wherein R is an alkyl radical having 4 to 20 carbon atoms, and about .001% to 5% by weight based on said poly-α-olefin of a nitrogen-containing compound selected from the group consisting of compounds having the formulas

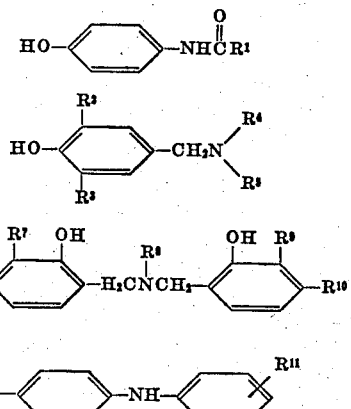

and

wherein $R^1$, $R^2$, $R^3$, $R^4$, $R^5$, $R^6$, $R^7$, $R^8$, $R^9$ and $R^{10}$ are alkyl radicals having 1 to 18 carbon atoms, and wherein $R^{11}$ is selected from the group consisting of alkyl radicals having 1 to 18 carbon atoms and alkoxy radicals having 1 to 18 carbon radicals.

3. A solid poly-α-olefin composition comprising solid polyethylene containing a stabilizer combination comprising about .001% to 5% by weight based on said polyethylene of a 3,3'-thiodipropionic acid having the formula $$S(CH_2CH_2COR)_2$$

wherein R is an alkyl radical having 8 to 18 carbon atoms, and about .001% to 5% by weight based on said polyethylene of nitrogen-containing compound selected from the group consisting of compounds having the formulas

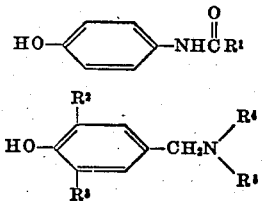

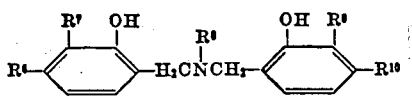

and

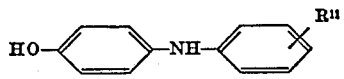

wherein $R^1$, $R^2$, $R^3$, $R^4$, $R^5$, $R^6$, $R^7$, $R^8$, $R^9$ and $R^{10}$ are alkyl radicals having 1 to 18 carbon atoms, and wherein $R^{11}$ is selected from the group consisting of alkyl radicals having 1 to 18 carbon atoms and alkoxy radicals having 1 to 18 carbon radicals.

4. A solid poly-α-olefin composition comprising solid polypropylene containing a stabilizer combination comprising about .001% to 5% by weight based on said polypropylene of a 3,3'-thiodipropionic acid having the formula

wherein R is an alkyl radical having 8 to 18 carbon atoms, and about .001% to 5% by weight based on said polypropylene of a nitrogen-containing compound selected from the group consisting of compounds having the formulas

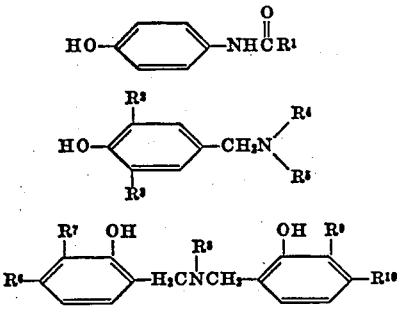

and

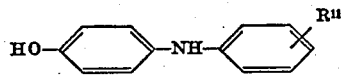

wherein $R^1$, $R^2$, $R^3$, $R^4$, $R^5$, $R^6$, $R^7$, $R^8$, $R^9$ and $R^{10}$ are are alkyl radicals having 1 to 18 carbon atoms, and wherein $R^{11}$ is selected from the group consisting of alkyl radicals having 1 to 18 carbon atoms and alkoxy radicals having 1 to 18 carbon radicals.

5. A solid poly-α-olefin composition comprising solid polypropylene containing a stabilizer combination comprising about .001% to 5% by weight based on said polypropylene of dilauryl-3,3'-thiodipropionate and about .001% to 5% by weight based on said polypropylene of a nitrogen-containing compound selected from the group consisting of compounds having the formulas

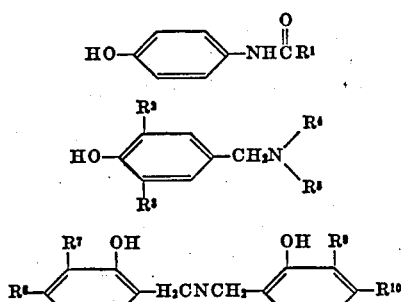

and

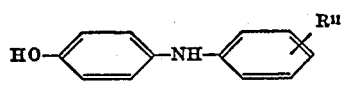

wherein $R^1$, $R^2$, $R^3$, $R^4$, $R^5$, $R^6$, $R^7$, $R^8$, $R^9$ and $R^{10}$ are alkyl radicals having 1 to 18 carbon atoms, and wherein $R^{11}$ is selected from the group consisting of alkyl radicals having 1 to 18 carbon atoms and alkoxy radicals having 1 to 18 carbon radicals.

6. A solid poly-α-olefin composition comprising solid polypropylene containing a stabilizer combination comprising about .001% to 5% by weight based on said polypropylene of a diester of 3,3'-thiodipropionic acid having the formula

wherein R is an alkyl radical having 8 to 18 carbon atoms and about .001% to 5% by weight based on said polypropylene of a nitrogen-containing compound having the formula

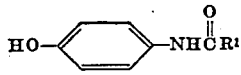

wherein $R^1$ is an alkyl radical having 1 to 12 carbon atoms.

7. A solid poly-α-olefin composition comprising solid polypropylene containing a stabilizer combination comprising about .001% to 5% by weight based on said polypropylene of a diester of 3,3'-thiodipropionic acid having the formula

wherein R is an alkyl radical having 8 to 18 carbon atoms and about .001% to 5% by weight based on said polypropylene of a nitrogen-containing compound having the formula

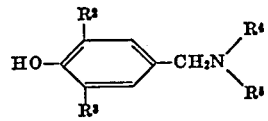

wherein $R^2$, $R^3$, $R^4$ and $R^5$ are alkyl radicals having 1 to 12 carbon atoms.

8. A solid poly-α-olefin composition comprising solid polypropylene containing a stabilizer combination comprising about .001% to 5% by weight based on said polypropylene of a diester of 3,3'-thiodipropionic acid having the formula

wherein R is an alkyl radical having 8 to 18 carbon atoms and about .001% to 5% by weight based on said polypropylene of a nitrogen-containing compound having the formula

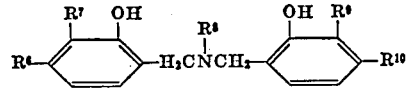

wherein $R^6$, $R^7$, $R^8$, $R^9$ and $R^{10}$ are alkyl radicals having 1 to 12 carbon atoms.

9. A solid poly-α-olefin composition comprising solid polypropylene containing a stabilizer combination comprising about .011% to 5% by weight based on said polypropylene of a diester of 3,3'-thiodipropionic acid having the formula

wherein R is an alkyl radical having 8 to 18 carbon atoms and about .001% to 5% by weight based on said polypropylene of a nitrogen-containing compound having the formula

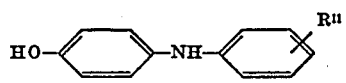

wherein R[11] is selected from the group consisting of alkyl radicals having 1 to 12 carbon atoms and alkoxy radicals having 1 to 12 carbon atoms.

10. A solid poly-α-olefin composition comprising solid polypropylene containing a stabilizer combination comprising .01% to 3% by weight based on said polypropylene of dilauryl-3,3'-thiodipropionate and .01% to 1% by weight based on said polypropylene of 4-hydroxy-4'-methoxydiphenylamine.

11. A solid poly-α-olefin composition comprising solid polypropylene containing a stabilizer combination comprising .01% to 3% by weight based on said polypropylene of dilauryl-3,3'-thiodipropionate and .01% to 1% by weight based on said polypropylene of N-lauroyl-p-aminophenol.

12. A solid poly-α-olefin composition comprising solid polypropylene containing a stabilizer combination comprising .01% to 3% by weight based on said polypropylene of dilauryl-3,3'-thiodipropionate and .01% to 1% by weight based on said polypropylene of N,N-bis(2-hydroxy-3-tert.-butyl-5-methylbenzyl)methylamine.

13. A solid poly-α-olefin composition comprising solid polypropylene containing a stabilizer combination comprising .01% to 3% by weight based on said polypropylene of dilauryl-3,3'-thiodipropionate and .01% to 1% by weight based on said polypropylene of 3-tert.-butyl-4'-hydroxydiphenylamine.

14. A solid poly-α-olefin composition comprising solid polypropylene containing a stabilizer combination comprising .01% to 3% by weight based on said polypropylene of dilauryl-3,3'-thiodipropionate and .01% to 1% by weight based on said polypropylene of 2,6-di-tert.-butyl-p-(dimethylaminomethyl)phenol.

References Cited in the file of this patent
UNITED STATES PATENTS

| | | |
|---|---|---|
| 2,448,799 | Happoldt et al. | Sept. 7, 1948 |
| 2,519,755 | Gribbins | Aug. 22, 1950 |
| 2,568,902 | Thompson et al. | Sept. 25, 1951 |
| 2,934,517 | Young | Apr. 26, 1960 |

UNITED STATES PATENT OFFICE
CERTIFICATE OF CORRECTION

Patent No. 3,072,604

January 8, 1963

Clarence E. Tholstrup

It is hereby certified that error appears in the above numbered patent requiring correction and that the said Letters Patent should read as corrected below.

Column 8, line 63, for ".011%" read -- .001% --.

Signed and sealed this 20th day of August 1963.

(SEAL)
Attest:

ERNEST W. SWIDER
Attesting Officer

DAVID L. LADD
Commissioner of Patents